United States Patent
Grunenwald et al.

(10) Patent No.: US 12,083,555 B2
(45) Date of Patent: Sep. 10, 2024

(54) METHOD FOR COMPACTING AN ANTI-CORROSIVE PAINT OF A TURBINE ENGINE PART

(71) Applicant: SAFRAN AIRCRAFT ENGINES, Paris (FR)

(72) Inventors: Anthony Cyrille Grunenwald, Moissy-Cramayel (FR); Romaric Jean-Marie Piette, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 17/771,738

(22) PCT Filed: Oct. 27, 2020

(86) PCT No.: PCT/FR2020/051943
§ 371 (c)(1),
(2) Date: Apr. 25, 2022

(87) PCT Pub. No.: WO2021/084202
PCT Pub. Date: May 6, 2021

(65) Prior Publication Data
US 2022/0410208 A1    Dec. 29, 2022

(30) Foreign Application Priority Data
Oct. 31, 2019 (FR) .................................. 1912298

(51) Int. Cl.
*B05D 3/06* (2006.01)
*B05D 1/02* (2006.01)
(Continued)

(52) U.S. Cl.
CPC ................. *B05D 3/06* (2013.01); *B05D 1/02* (2013.01); *B05D 5/12* (2013.01); *B05D 7/14* (2013.01);
(Continued)

(58) Field of Classification Search
None
See application file for complete search history.

(56) References Cited

U.S. PATENT DOCUMENTS

| 5,066,846 A * | 11/1991 | Pirl ....................... F22B 37/003 219/121.78 |
| 2005/0173388 A1* | 8/2005 | Lavers ..................... B23H 9/10 205/665 |

(Continued)

FOREIGN PATENT DOCUMENTS

| EP | 0 278 942 A1 | 8/1988 |
| FR | 2 385 810 A1 | 10/1978 |

(Continued)

OTHER PUBLICATIONS

English translation of Written Opinion mailed Dec. 4, 2020, issued in corresponding International Application No. PCT/FR2020/051943, filed Oct. 27, 2020, 6 pages.
(Continued)

*Primary Examiner* — Michael P. Rodriguez
(74) *Attorney, Agent, or Firm* — CHRISTENSEN O'CONNOR JOHNSON KINDNESS PLLC

(57) ABSTRACT

A method compacts an anti-corrosive paint having metal particles of a mechanical part such as a turbine engine part. The mechanical part extends along a longitudinal axis X and has a radially outer surface covered with a first layer of anti-corrosive paint. The method includes at least one step of generating a laser beam on the first layer of anti-corrosive
(Continued)

paint to bring the metal particles into contact and to render the anti-corrosive paint electrically conductive.

14 Claims, 2 Drawing Sheets

(51) Int. Cl.
  *B05D 5/12* (2006.01)
  *B05D 7/14* (2006.01)
  *F02C 7/36* (2006.01)
(52) U.S. Cl.
  CPC .......... *F02C 7/36* (2013.01); *F05D 2230/90* (2013.01); *F05D 2260/95* (2013.01)

(56) References Cited

U.S. PATENT DOCUMENTS

| | | | | |
|---|---|---|---|---|
| 2010/0136296 A1* | 6/2010 | Collins | ................... | C21D 7/06 427/554 |
| 2015/0158146 A1* | 6/2015 | Boulogne | ................ | B24C 1/10 451/38 |

FOREIGN PATENT DOCUMENTS

| | | |
|---|---|---|
| FR | 3 040 013 A1 | 2/2017 |
| FR | 3 060 608 A1 | 6/2018 |
| WO | WO-9118705 A1 * | 12/1991 |
| WO | 2004/040037 A1 | 5/2004 |

OTHER PUBLICATIONS

International Preliminary Report on Patentability mailed May 3, 2022, issued in corresponding International Application No. PCT/FR2020/051943, filed Oct. 27, 2020, 6 pages.

International Search Report mailed Dec. 4, 2020, issued in corresponding International Application No. PCT/FR2020/051943, filed Oct. 27, 2020, 6 pages.

Written Opinion mailed Dec. 4, 2020, issued in corresponding International Application No. PCT/FR2020/051943, filed Oct. 27, 2020, 5 pages.

* cited by examiner

METHOD FOR COMPACTING AN ANTI-CORROSIVE PAINT OF A TURBINE ENGINE PART

FIELD OF THE DISCLOSURE

The present disclosure relates to the field of the surface treatments or preparations of mechanical parts against corrosion. It is aimed in particular at a method for compacting an anti-corrosive paint covering a part, in particular a turbine engine part.

BACKGROUND

The mechanical parts, in particular those used in the aircraft turbine engines, are exposed to harsh environments in terms of temperature, corrosive elements, and oxidation reactions. The parts, such as compressor and/or turbine shafts, are for example made of a steel or a steel alloy with a reduced cobalt content so as to have a high mechanical strength. These steels are very sensitive to corrosion phenomena which are mainly manifested by the development of corrosion pits which consist of localized and deep attacks. These parts are also subject to strong mechanical stresses during the operation of the turbine engine, which can lead to the development of corrosion. The synergistic effect of stress/corrosion leads to a significant increase in corrosion phenomena.

Some parts have been covered with a paint resistant to high temperatures and to various corrosive and oxidative elements (kerosene, oil, etc.) so that they can withstand the environment in which they evolve, and in particular protect them from corrosion. This paint being composed partly of chromium trioxide, has been classified as CMR which is the acronym of Carcinogenic, Mutagenic, Reprotoxic, and is hit by the regulation "REACH" on the Registration, Evaluation, Authorization and Restriction of Chemical substances.

In order to avoid the constraints of this regulation, a solution consisting in making the paint anodic has been developed. Examples of this solution are described in the documents FR-A1-2991216 and FR-A1-3040013. In particular, this solution consists of spraying a liquid paint with a mineral binder and loaded with metal particles onto the surface of the part. This paint is sprayed via a gun handled by an operator or a mechanical arm, and the paint-coated part is then heated in an oven to polymerize the sprayed paint. Then, the polymerized paint undergoes a mechanical action such as compaction in order to bring the metal particles into contact without degrading the cosmetic and physical aspect of the paint depending on the type of compaction performed. This action allows to achieve an electrical continuity between the metal particles of the paint and the metallic portions to be treated. The paint layer is thus made dense and electrically conductive to make it a sacrificial layer that will preferentially corrode, instead of the metal of the part to be protected. We speak then of an anodic paint to designate the sacrificial layer made conductive.

Compacting consists of sanding or blasting the painted portions after polymerization with white corundum particles, glass beads, or plastic particles. However, the particles used for compaction can become embedded in the paint and on the surface of the paint. During operation, a release of these particles can occur, which can damage other members of the turbine engine (bearing rolling) that are in the path of these particles, which can have a very high hardness such as corundum (9.5 on the MOHS scale).

To limit the release of very hard particles, in particular at very high speeds, some parts are not compacted, which results in a reduction of the anti-corrosive properties of the coating. The other alternative is to cover the compacted anti-corrosive paint with a top coat to contain any particles in the paint, which extends the manufacturing time of the part, not to mention the various steps required to prepare the part before, during and after the application of the paint. Moreover, the control of the thickness of the different layers of paint is delicate and in particular on parts with a complex configuration.

SUMMARY

One objective of the present disclosure is in particular to provide a simple and effective solution allowing to provide a densification of an anti-corrosive paint to increase the corrosion protection without incrustation of hard particles and while avoiding the degradation of the anti-corrosive paint.

This is achieved in accordance with the disclosure by means of a method for compacting an anti-corrosive paint comprising metal particles of a mechanical part such as a turbine engine part, the mechanical part extending along a longitudinal axis X and comprising a radially external surface coated with a first layer of anti-corrosive paint, the method comprising at least one step of generating a laser beam on the first layer of anti-corrosive paint so as to bring the metal particles into contact with each other and to render the anti-corrosive paint electrically conductive.

Thus, this solution allows to achieve the above-mentioned objective. In particular, the use of at least one laser beam avoids the use of media (plastics, ceramics, metals, etc.) that may be released when the mechanical part is driven in rotation. This type of compaction, which brings the aluminium-based metal particles into contact with each other to obtain the electrical conductivity and therefore the anti-corrosive properties, is achieved by an energy supply to the surface. This energy supply will allow to change the state of the material of the particles so that they agglomerate with each other. The physical integrity of the paint is thus preserved. Finally, this method can be easily automated and allows to overcome the release of foreign particles without the need to apply a top coat, thus reducing manufacturing time and cost.

The method also comprises one or more of the following characteristics or steps, taken alone or in combination:
- the method comprises a step of installing the mechanical part in an enclosure intended to receive an inert gas such as nitrogen or argon.
- the contacting of the metal particles is determined by a heating of the metal particles to a threshold temperature value less than or equal to the melting temperature of the material of the metal particles.
- the power of the laser beam is between 200 and 1000 W.
- the laser beam consists of a single beam with an emission wavelength between 1000 and 1500 nm.
- the laser beam scans the first layer of anti-corrosive paint on the part along a helical path.
- the method comprises a step of moving the laser beam along a first direction orthogonal to the longitudinal axis X, the mechanical part being rotated about the longitudinal axis and translated along the longitudinal axis.
- the mechanical part is hollow.
- the mechanical part comprises a radially internal surface coated with a second layer of anti-corrosive paint, and in that the laser beam is generated inside the mechanical part and reflected inside the mechanical part so as to reach the second layer of anti-corrosive paint, the laser beam scanning the second layer of anti-corrosive paint along a helical path.

the mechanical part is a turbine engine shaft.

the method comprises a step of moving the laser source in a first direction orthogonal to the longitudinal axis and in a second direction parallel to the longitudinal axis, the mechanical part being rotated about the longitudinal axis.

the laser is of the Nd:YAG type.

the metal particles in the paint comprise aluminium.

The disclosure relates to a method for producing an anodic coating, the method comprising the following steps:

supplying a mechanical part of longitudinal axis, spraying a liquid paint loaded with metal particles onto at least one surface of the mechanical part, polymerizing the paint sprayed on the part so as to obtain a layer of anti-corrosive paint intended to protect the part, compacting the anti-corrosive paint so as to obtain an anodic paint, the compacting comprising at least one projection of a laser beam in the direction of the anti-corrosive paint so as to bring into contact the metal particles and to render the anti-corrosive paint electrically conductive.

The disclosure also relates to the use of a laser beam from at least one laser source to perform a compaction of anti-corrosive paint coating a mechanical part, and in particular a turbine engine part.

The disclosure also relates to a mechanical part, in particular of a turbine engine, which is at least partially covered with an anti-corrosive paint compacted according to the above-mentioned method.

Finally, the disclosure relates to a compacting installation for carrying out a method for compacting a mechanical part comprising:

an enclosure, a mechanical part with a longitudinal axis comprising at least one radially external surface that is coated with a first anti-corrosive paint layer comprising metal particles, the mechanical part being installed in the enclosure, and a compacting device comprising a laser source intended to generate at least one laser beam towards the first paint layer so as to bring into contact the metal particles and to render the anti-corrosive paint electrically conductive.

DESCRIPTION OF THE DRAWINGS

The disclosure will be better understood, and other purposes, details, characteristics and advantages thereof will become clearer upon reading the following detailed explanatory description of embodiments of the disclosure given as purely illustrative and non-limiting examples, with reference to the appended schematic drawings in which.

DETAILED DESCRIPTION

Figure 1:
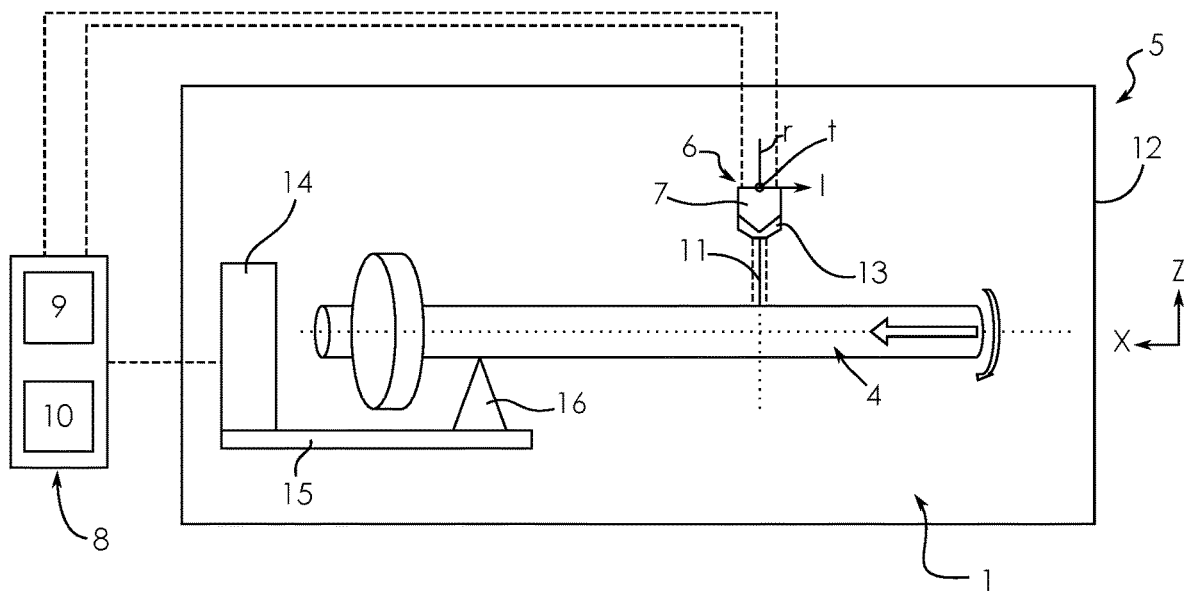
FIG. 1 is a schematic view of an axial section of a mechanical part, such as a turbine engine shaft, installed in an enclosure of a compacting installation according to the disclosure.
Figure 2:
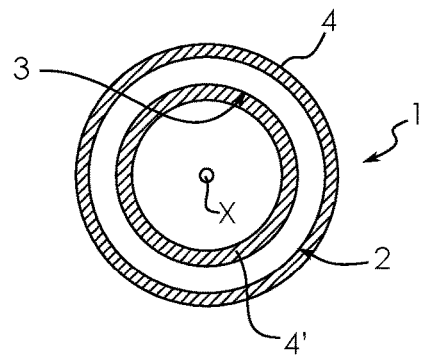
FIG. 2 is a schematic, radial cross-sectional view of a mechanical part comprising paint layers on its radially internal and external surfaces according to the disclosure.
Figure 3:
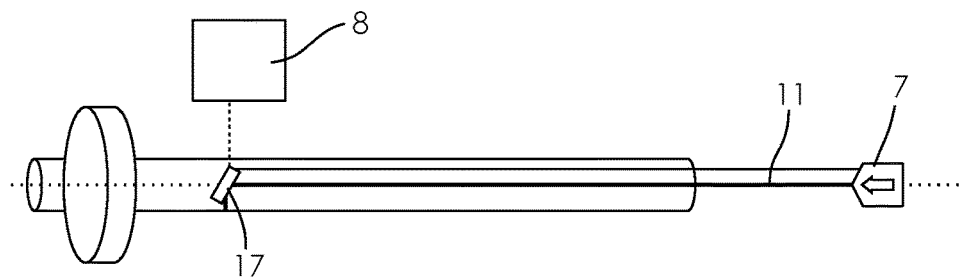
FIG. 3 shows the arrangement of the compacting device for making a layer of paint, arranged inside a hollow part, electrically conductive according to the disclosure.

FIGS. 1 to 3 show an axial section of a mechanical part 1, in particular of a mechanical part of an aircraft turbine engine, in an installation for compacting an anti-corrosive paint which coats at least one surface of the mechanical part 1.

By mechanical parts we mean parts intended to ensure a mechanical function in service, which implies that these parts have a good mechanical strength and a good resistance to corrosion and wear. The turbine engine shafts, and in particular compressor and/or turbine shafts, are thus examples of mechanical parts concerned by the disclosure. Typically, the turbine engine shafts are made of a metallic material or a metallic alloy. The metal material or metal alloy comprises steel for example.

As can be seen in FIGS. 1 to 3, the mechanical part 1 is a turbine engine shaft that extends along a longitudinal axis X. The turbine engine shaft is hollow here. The shaft comprises a radially external surface 2 and a radially internal surface 3 opposite each other along a radial axis Z perpendicular to the longitudinal axis X.

We recall that, prior to the compaction method, the radially external surface of the part 1 is coated with a first layer 4 of anti-corrosive paint, illustrated schematically in FIG. 2. The paint is an inorganic paint or any paint comprising metal particles. In particular, a liquid paint loaded with metal particles is sprayed on the surface of the part. Advantageously, the metal particles are aluminium particles. Examples of anti-corrosive paints applied to the surface of the parts are those known under the brand name Sermetel W® or Maberbind CF®.

After spraying the paint, the coated part 1 is polymerized so that the paint hardens and forms the anti-corrosive paint intended to protect the part.

The anti-corrosive paint is then compacted. For this purpose, the compaction is carried out in a compacting installation 5. By the term compaction, in the present disclosure, we mean using an energy external to the surface of the part coated with the metal particle paint layer so as to at least partially change the state of the material and bring the metal particles into contact. In this way, the anti-corrosive paint is densified and the contact of the metal particles with the paint increases its corrosion resistance. The paint is render electrically conductive. We then obtain an anodic coating.

The installation 5 comprises a compacting device 6 which is equipped with a head 7 connected to an energy source intended to supply energy to the surface of the first layer 4 of anti-corrosive paint. The energy source is controlled by an electronic command system 8 of the installation. Typically, the electronic command system 8 is equipped with at least one microcontroller 9 and a memory 10 where many compaction parameters are stored.

In the present example, the energy source is configured to generate or spray at least one primary laser beam 11 onto the paint coating the mechanical turbine engine part. The output transmission wavelength of the laser beam is between ultraviolet (UV) and infrared (IR). The power of the laser is between 200 and 1000 Watt (W).

The compacting device 6 is advantageously installed in an enclosure 12 provided for this purpose. The enclosure 12 is closed, for example, by means of a door through which the part 1 is introduced. The generation of the laser beam 11 is carried out under gas protection in order to avoid any oxidation of the paint during the heating or increase in temperature of the metal particles and to preserve the anti-corrosion properties of the paint. The gas used is an inert gas such as Argon or Nitrogen.

Advantageously, the inert gas flow is sprayed by means of at least one nozzle 13 coaxial to the laser beam so that the most critical area (which receives the laser beam directly) is constantly protected by a neutral atmosphere. The electronic command system 8 is also connected to the inert gas flow spray nozzle. Alternatively, the inert gas flow is sprayed by means of a nozzle that is arranged in the vicinity of the laser beam so that the gas flow protects the critical area and its close surroundings as well.

The contacting of the metal particles is determined by a heating of the metal particles to a threshold temperature value less than or equal to the melting temperature of the material of the metal particles. In this example, the melting temperature of the metal particles for aluminium is about 660° C. The temperature threshold value below the melting temperature of the metal is possible due to the thermal shrinkage of the binder (contraction of the silicate network) and the creep of the metal particles.

The heating of the metal particles (and of the paint layer) is defined by a focus of the laser beam and a linear energy density. In particular, the focus of the beam is controlled by adjusting the opening of a diaphragm which allows to manage the size of the laser beam. The heating of the material of the particles causes a change in orientation as explained below.

The Linear Energy Density (LE) of the laser is adjusted according to the parameters of the paint (thickness, behaviour, etc.) and its conductivity properties. In the present disclosure, the linear energy density corresponds to the ratio between the laser power P (expressed in Joule (J)/second (s)) and the scanning speed V of the laser expressed in millimetre (mm)/s. The linear energy density is expressed in J/mm. Indeed, a too low linear energy density could create defects of the type lack of connection between the particles and possibly a degradation of the quality of the conductive properties of the sacrificial layer. On the other hand, too much energy could lead to too much melting of the aluminium particles and result in a heterogeneous layer of the paint (porosity, thickness).

Advantageously, but not restrictively, the laser source is of the Nd:YAG (yttrium aluminium garnet) type doped with neodymium. This type of laser generates an energy that is compatible with the energy requirements for this application. The emission wavelength of the laser beam is about 1064 nanometres (nm). The power of the laser beam is between 200 and 400 Watt (W).

Figure 4:
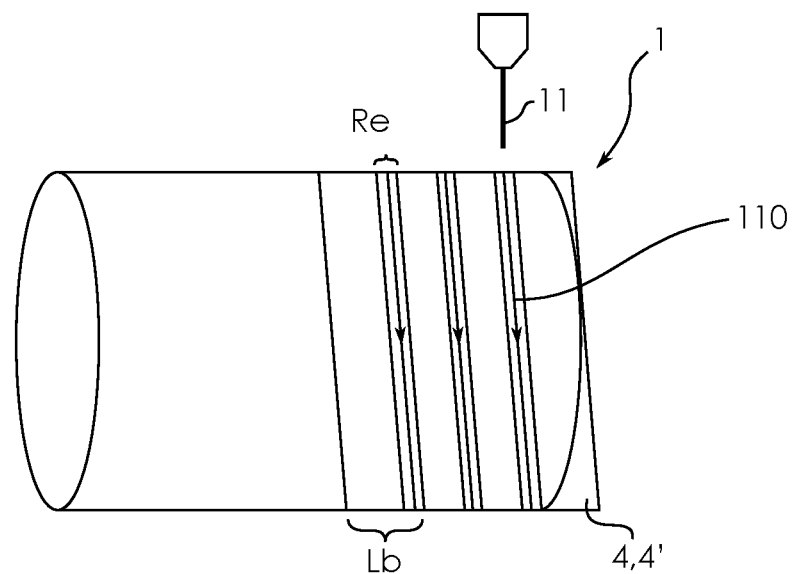
FIG. 4 schematically represents the path of the scanning of the laser on a radially external surface of the mechanical part according to the disclosure.

With reference to FIG. 4 and in order to provide a uniform conductivity in the paint layer 4, the scanning of the laser on the anti-corrosive paint is performed along a helical 110 or corkscrew path. The paint here has a thickness of between 20 and 90 µm. The laser beam is applied to the surface of the paint with an overlap rate Re of about 10% and a bandwidth Lb of about 1 mm. The linear energy density depends on the source, the focus of the laser beam and the type of paint.

In the present disclosure, the term "helical path" means the path of the laser beam on the anti-corrosive paint corresponding to a translational displacement along a first direction and a rotational displacement in a plane orthogonal to the first direction of the laser beam with respect to the part or the part with respect to the laser beam.

In one embodiment, the turbine engine shaft is rotated about the longitudinal axis X and moves along the longitudinal axis and preferably simultaneously. Advantageously, the displacement of the shaft is a translation. For this purpose, the compacting installation 5 comprises an element 14 for rotating the shaft which is mounted on a frame 15. Guiding bearings 16 mounted on the frame allow the shaft to rotate relative to the frame. Advantageously, the rotation element 14 is an electric or thermal motor. The motor is connected to the electronic command system 8, which controls the rotation of the motor in one direction or another. Similarly, the generating head 7 of the laser moves along a direction r that is parallel to the radial axis Z. This is also a translation. In other words, the generation head of the laser will be stationary along the directions l and t. The words " " are used for the displacement of the laser head. The head 7 will move along the direction r in order to adjust the focus of the laser and adapt to the geometry of the turbine engine shaft. The shaft rotated advances at a predetermined pitch. The pitch can be of the order of 1 mm/turn. The concatenation of the rotation and the translation of the turbine engine shaft will allow a scanning of the laser along the helical path. Advantageously, but not restrictively, the electronic command system is connected to the compacting device 6 in order to control the displacement of the head 7.

In a further embodiment, the turbine engine shaft is rotated around the longitudinal axis and the head 7 of the compacting device 6 is moved in the direction r and in a direction parallel to the longitudinal axis X in order to achieve the scanning of the laser along a helical path.

In the present embodiment, the radially internal surface 3 of the shaft also comprises a layer of anti-corrosive paint referred to as "second paint layer" 4' comprising metal particles. This second layer 4' of anti-corrosive paint is identical to the first layer 4. Alternatively, the first and the second layers 4, 4' are different.

In order to reach the second layer 4, 4' of paint (located inside the shaft), a deflection member 17 is installed inside the turbine engine shaft. The deflection member 17 is pivotally mounted inside the shaft and its pivoting is controlled by the electronic command system 8 to which it is connected. Advantageously, the deflection member 17 is a deflection mirror. In this way, the laser beam that hits the mirror is reflected on the second layer of paint. The scanning of this second paint layer 4' is carried out in the same way as for the first paint layer 4, i.e. following a helical path.

Figure 5:
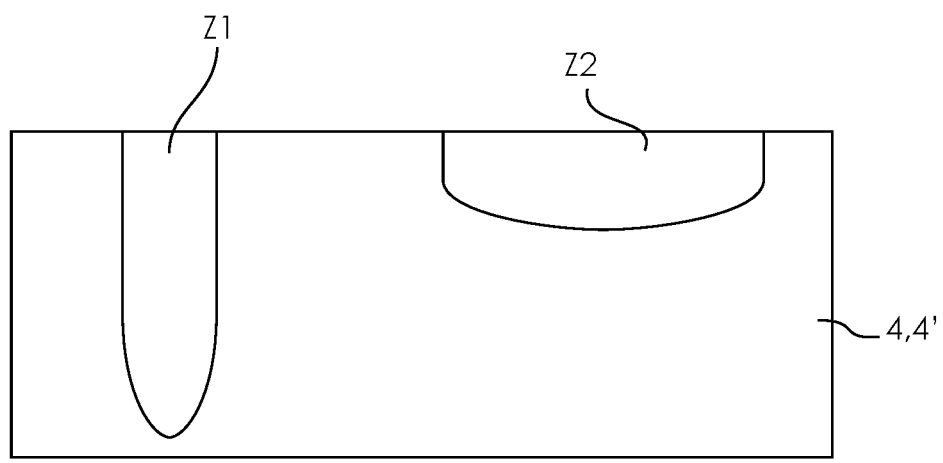
FIG. 5 schematically illustrates an anti-corrosive paint layer with areas thermally affected by the laser according to the disclosure.

FIG. 5 illustrates a layer 4 or 4' of anti-corrosive paint with aluminium particles having a thickness in the range of 20 to 90 µm. Depending on the focus of the laser beam, it will diffuse more or less throughout the thickness of the paint layer. For example, a focus of 100% generates an area Z1 whose depth is approximately equal to the thickness of the paint layer. On the other hand, a focusing of about 40% generates an area Z2 whose depth is less than the thickness of the paint layer 4, 4'.

We will now describe the method of compacting the turbine engine part, using the installation 5 described above. The method comprises a step of installing the mechanical part in the enclosure 12. The part is rotated by the electronic command system 8. Simultaneously or after the rotation step, a laser beam is generated on the layer 4 of paint coating the part 1. The mechanical part 1 is also moved in translation along the longitudinal axis so that the laser scans the paint layer along the helical path. During this generation step, the energy supply will allow to bring the temperature of the aluminium particles to a value corresponding to that of their melting temperature or to a value lower than it so that the particles are melted or partially melted and can agglomerate with each other. We understand that this allows a change of orientation or displacement of the metal particles for the contact. The particles in contact realize an electrical continuity. Also, the inert gas is sprayed into the enclosure concomitantly with the generation step of the laser.

Subsequently, the mirror (deflection member 17) is installed inside the hollow part and the second layer 4' is scanned with the laser beam also along a helical path.

The invention claimed is:

1. A method for compacting an anti-corrosive paint comprising metal particles of a mechanical part, the mechanical part extending along a longitudinal axis X and comprising a radially external surface, the method comprising a step of spraying a liquid paint loaded with metal particles onto the at least one radially external surface of the mechanical part and a step of polymerization of the liquid paint sprayed so as to form a first layer of anti-corrosive paint intended to protect the part, the method comprising at least one step of generating a laser beam on the surface of the first layer of anti-corrosive paint so as to bring the metal particles into contact and to render the anti-corrosive paint electrically conductive without degradation of the anti-corrosive paint, wherein the anti-corrosive paint is not covered and forms the external surface of the mechanical part.

2. The method according to claim 1, further comprising a step of installing the mechanical part in an enclosure configured to receive an inert gas.

3. The method according to claim 1, wherein contact of the metal particles is determined by a heating of the metal particles to a threshold temperature value less than or equal to a melting temperature of the material of the metal particles.

4. The method according to claim 1, wherein the laser beam consists of a single beam with an emission wavelength between 1000 and 1500 nm.

5. The method according to claim 1, wherein the laser beam scans the first layer of anti-corrosive paint on the mechanical part along a helical path.

6. The method according to claim 5, further comprising a step of moving the laser beam along a first direction orthogonal to the longitudinal axis X, the mechanical part being rotated about the longitudinal axis X and translated along the longitudinal axis X.

7. The method according to claim 1, wherein the mechanical part is hollow.

8. The method according to claim 7, wherein the mechanical part comprises a radially internal surface coated with a second layer of anti-corrosive paint, and the laser beam is generated inside the mechanical part and reflected inside the mechanical part so as to reach the second layer of anti-corrosive paint, the laser beam scanning the second layer of anti-corrosive paint along a helical path.

9. The method according to claim 1, wherein the mechanical part is a turbine engine shaft.

10. The method according to claim 1, wherein the laser beam is generated from a laser of the Nd:YAG type.

11. The method according to claim 1, wherein the metal particles of the paint comprise aluminium.

12. The method according to claim 2, wherein the inert gas is at least one of nitrogen or argon.

13. The method according to claim 1, wherein the mechanical part is a turbine engine part.

14. A method for compacting an anti-corrosive paint comprising metal particles of a mechanical part, the mechanical part extending along a longitudinal axis X and comprising a radially external surface, the method comprising the steps of:
spraying a liquid paint loaded with metal particles onto the at least one radially external surface of the mechanical part and a step of polymerization of the liquid paint sprayed so as to form a first layer of anti-corrosive paint intended to protect the part, and
generating a laser beam on the surface of the first layer of anti-corrosive paint so as to bring the metal particles into contact and to render the anti-corrosive paint electrically conductive without degradation of the anti-corrosive paint, wherein a power of the laser beam is between 200 and 1000 W.

* * * * *